(12) United States Patent
Aweya et al.

(10) Patent No.: US 7,835,366 B2
(45) Date of Patent: Nov. 16, 2010

(54) THREE-WAY MESSAGE EXCHANGE CLOCK SYNCHRONIZATION

(75) Inventors: James Aweya, Kanta (CA); Michel Ouellette, Orleans (CA); Delfin Montuno, Kanata (CA); Kent Felske, Kanta (CA)

(73) Assignee: Ciena Corporation, Linthicum, MD (US)

( * ) Notice: Subject to any disclaimer, the term of this patent is extended or adjusted under 35 U.S.C. 154(b) by 1171 days.

(21) Appl. No.: 11/362,697

(22) Filed: Feb. 27, 2006

(65) Prior Publication Data

US 2007/0097947 A1   May 3, 2007

Related U.S. Application Data

(60) Provisional application No. 60/732,276, filed on Nov. 1, 2005.

(51) Int. Cl.
*H04L 12/28* (2006.01)
*H04J 3/06* (2006.01)

(52) U.S. Cl. .................................. 370/395.62; 370/503

(58) Field of Classification Search ................. 370/324, 370/350, 395.62, 503–520
See application file for complete search history.

(56) References Cited

U.S. PATENT DOCUMENTS

| | | | | |
|---|---|---|---|---|
| 5,815,689 A * | 9/1998 | Shaw et al. | ................. | 713/400 |
| 5,970,107 A * | 10/1999 | Bleiweiss et al. | ...... | 370/395.62 |
| 6,199,169 B1 * | 3/2001 | Voth | ........................... | 713/400 |
| 6,449,291 B1 * | 9/2002 | Burns et al. | ................. | 370/516 |
| 6,496,553 B1 | 12/2002 | Rokugo | | |
| 6,898,213 B1 | 5/2005 | Shimelmitz et al. | | |
| 6,980,586 B1 * | 12/2005 | Ballinger | .................... | 375/150 |
| 7,010,074 B2 * | 3/2006 | Nakamura | ................... | 375/371 |
| 7,114,091 B2 * | 9/2006 | Vrancic | ...................... | 713/400 |
| 7,203,240 B2 * | 4/2007 | Kim et al. | ............. | 375/240.28 |
| 7,372,875 B2 * | 5/2008 | Hadzic et al. | ............... | 370/516 |
| 7,379,480 B2 * | 5/2008 | Balasubramanian et al. | | 370/516 |
| 2002/0027886 A1 * | 3/2002 | Fischer et al. | ............... | 370/255 |
| 2003/0056136 A1 * | 3/2003 | Aweya et al. | ............... | 713/400 |
| 2004/0062278 A1 | 4/2004 | Hadzic et al. | | |

(Continued)

FOREIGN PATENT DOCUMENTS

EP   1 294 116 A2   3/2003

OTHER PUBLICATIONS

Mills, Improved Algorithms for Synchronizing Computer Network Clocks, IEEE/ACM Transactions on Networking, Jun. 1995, pp. 245-254, vol. 3, No. 3.*

*Primary Examiner*—Chirag G Shah
*Assistant Examiner*—Jenkey Van
(74) *Attorney, Agent, or Firm*—Christopher & Weisberg, P.A.

(57) ABSTRACT

The invention includes a technique for clock recovery in a network having master and slave clocks in respective Time Division Multiplexing ("TDM") network segments which are interconnected by a non-TDM segment. Master clock timestamps are sent to the slave. The slave measures a master clock timestamp inter-arrival interval, and sends slave clock timestamps to the master. The master measures a slave clock timestamp inter-arrival interval, and sends that slave clock timestamp inter-arrival interval to the slave. The slave then calculates an error signal based at least in-part on the difference between the master clock timestamp inter-arrival interval and the slave clock timestamp inter-arrival interval, and employs the difference to recover the first service clock in the second TDM segment.

20 Claims, 4 Drawing Sheets

U.S. PATENT DOCUMENTS

2004/0114632 A1* 6/2004 Yuuki et al. .................. 370/503
2005/0100054 A1* 5/2005 Scott et al. .................. 370/503
2005/0207387 A1* 9/2005 Middleton et al. .......... 370/347
2006/0245453 A1* 11/2006 Bedrosian ................... 370/503

* cited by examiner

THREE-WAY MESSAGE EXCHANGE CLOCK SYNCHRONIZATION

CROSS-REFERENCE TO RELATED APPLICATIONS

A claim of priority is made to U.S. provisional patent application Ser. No. 60/732,276, entitled TECHNIQUE FOR DIFFERENTIAL CLOCK RECOVERY IN PACKET NETWORKS, filed Nov. 1, 2005, which is incorporated by reference.

FIELD OF THE INVENTION

This invention relates generally to the field of network communications, and more particularly to clock synchronization for Circuit Emulation Service.

BACKGROUND OF THE INVENTION

Circuit Emulation Service ("CES") allows time division multiplexing ("TDM") services such as DS-n and E-n circuits to be transparently extended across a packet network. With circuit emulation over IP, for example, TDM data received from an external device at the edge of an Internet Protocol ("IP") network is converted to IP packets, sent through the IP network, passed out of the IP network to its destination, and reassembled into a TDM bit stream. One application of CES is the interconnection of enterprise private telephone networks at different sites. For example, CES over a packet network can be used to connect two private branch exchanges ("PBXs") on two different campuses without having packet transport capabilities on the PBXs themselves. This interworking allows voice traffic between the two campuses to use a packet network backbone instead of leased TDM lines, and also allows voice and data traffic to use the same packet network.

In order for CES to function properly it is desirable to achieve the same clock in both the transmitting and receiving ends of a TDM circuit from end-to-end such that, for example, the T1 stream of a downstream PBX transmits with the clocking characteristics as the T1 stream of the upstream PBX. Known clocking techniques include both synchronous and asynchronous clocking modes, of which the asynchronous clocking modes include Differential Clock Recovery, Independent Clocking, Clock Recovery using Simple Timestamps, Adaptive Buffer-Fill-based Clock Recovery, and Adaptive Packet Inter-arrival Time Averaging-based Clock Recovery.

In the timestamp-based technique for clock synchronization, a master periodically sends explicit time indications or timestamps to a slave to enable the slave to synchronize its local clock to the transmitter's clock. A high-level view of a clock synchronization scheme based on timestamps is shown in FIG. 1. This synchronization strategy allows multiple slaves, for example in a broadcast or point-to-multipoint communication scenario, to synchronize their clocks to the master. The master clock could consist essentially of an oscillator and a pulse counter. The oscillator issues periodic pulses that constitute the input to the pulse (timestamp) counter. The output of the counter represents the master clock signal and is incremented by a fixed amount at each pulse. Samples of master clock signals are communicated to the slave as timestamps.

A phase lock loop ("PLL") at the slave uses the timestamps, which constitute the PLL reference signal, to lock onto the master clock. The PLL has four main components: a phase detector, a loop filter, an analog or digitally controlled oscillator, and a timestamp counter. The phase detector computes the error signal as the difference between the reference signal and the output signal of the PLL. The error signal is passed on to the loop filter which is responsible for eliminating possible jitter and noise in the input signal. The controlled oscillator, which typically has a center frequency, oscillates at a frequency which is determined by the output signal of the loop filter. However, it would be desirable to reduce PLL input error.

SUMMARY OF THE INVENTION

In accordance with the invention,
One advantage of the three-way technique is that it generates lower PLL input errors as compared to the one-way technique. This advantage is in-part a result of employing reverse packet delay variation ("PDV") to mitigate the effects of the forward PDV on the PLL input error.

DETAILED DESCRIPTION

Figure 1:
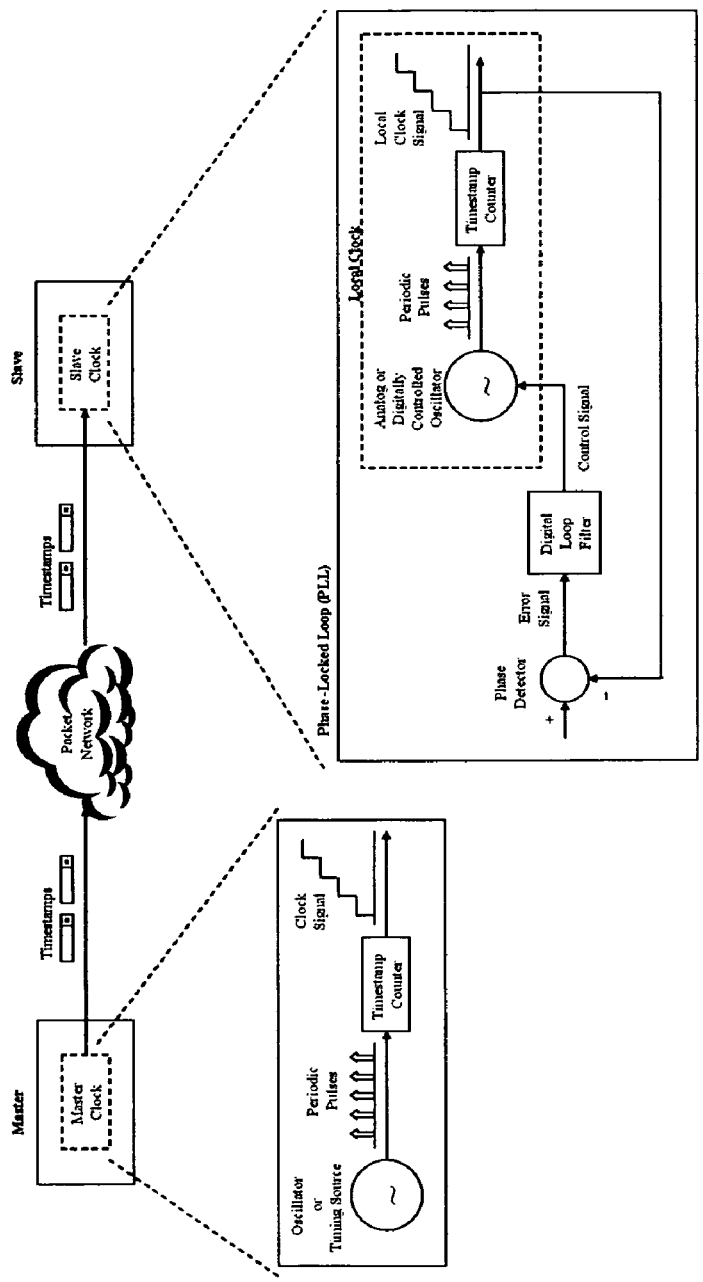
FIG. 1 is a high-level view of a prior art clock synchronization scheme based on timestamps.
Figure 2:
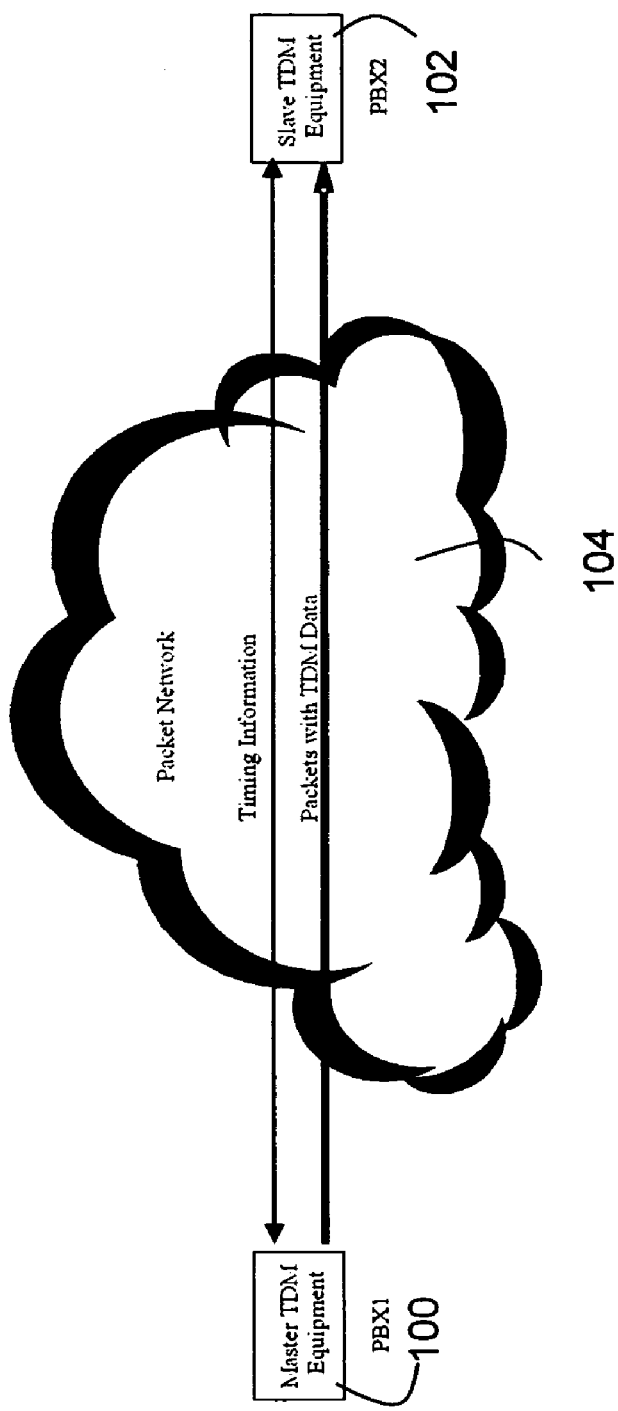
FIG. 2 is a high-level view of three-way message exchange for CES.

Referring to FIG. 2, CES can be supported in a network where a TDM transmitter such as a PBX (100) communicates with a TDM receiver such as a PBX (102) via a packet network (104). The clock of PBX (100) is designated as the master clock and the clock of PBX (102) is designated as the slave clock. The PBXs, or other network devices, are operable to facilitate synchronization of the master and slave clocks by exchanging timing information in accordance with a three-way message exchange technique as will be described in detail below.

Figure 3:
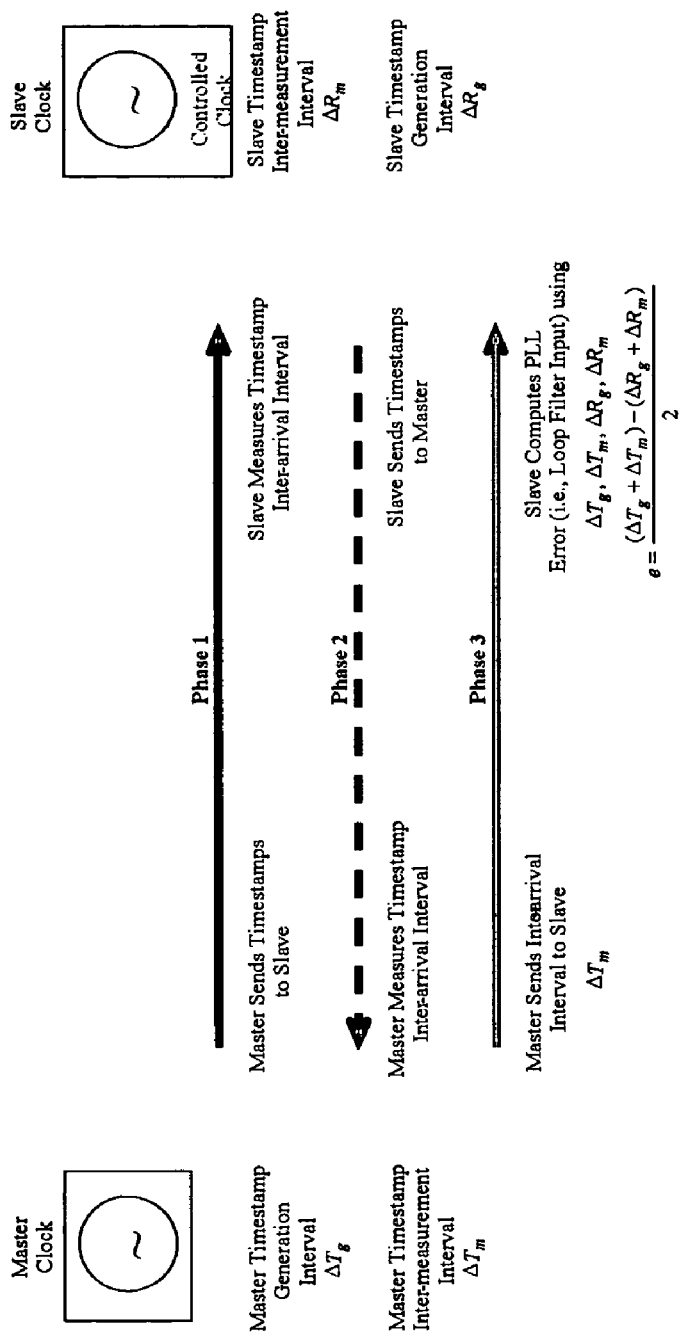
FIG. 3 illustrates the three phases of the three-way message exchange in greater detail.
Figure 4:
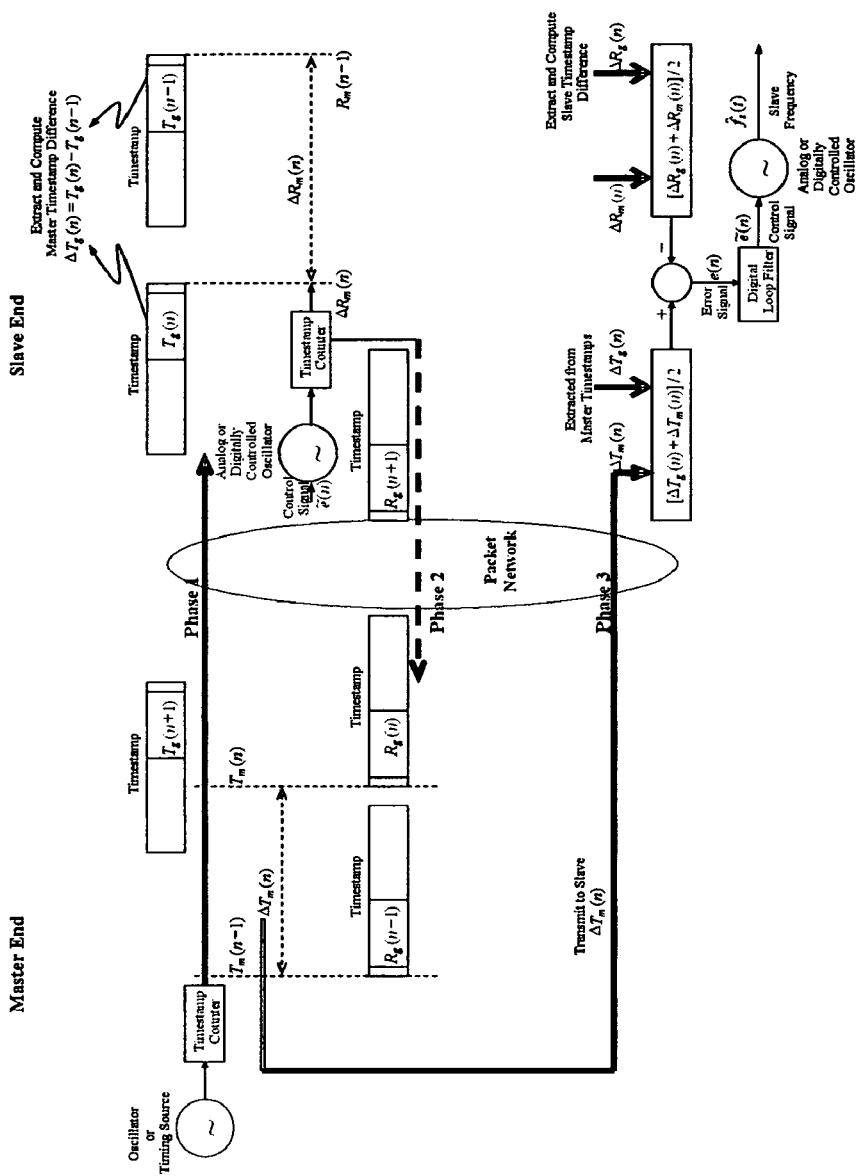
FIG. 4 illustrates operations of the master and slave in greater detail.

Referring to FIGS. 2 through 4, the master clock in the three-way message exchange technique may consist essentially of an oscillator and a pulse counter. The oscillator issues periodic pulses that constitute the input to the pulse (timestamp) counter. The output of the counter represents the master clock signal and is incremented by a fixed amount at each pulse. A phase-locked loop ("PLL") at the slave uses the timestamps to lock onto the master clock. The PLL has four main components: a phase detector, a loop filter, an analog or digitally controlled oscillator and a timestamp counter. The output of the counter represents the slave clock signal and is incremented by a fixed amount at each pulse.

The three-way message exchange technique has three phases. In Phase 1, samples of master clock signals are communicated to the slave as timestamps, $T_g(n)$, n=1, 2, 3, K. The slave extracts the timestamp generation intervals from the timestamps received from the master, and also measures timestamp inter-arrival intervals, $\Delta R_m(n)=R_m(n)-R_m(n-1)$, from the arriving timestamps using its local counter. In Phase 2, samples of slave clock signals are also communicated to the master as timestamps $R_g(n)$, n=1, 2, 3, K. The master measures timestamp inter-arrival intervals, $\Delta T_m(n)=T_m(n)-T_m(n-1)$, from the arriving timestamps sent from the slave using its local counter. In Phase 3, the timestamp inter-arrival interval measurements, $\Delta T_m(n)$, n=1, 2, 3, K, taken by the master are then communicated to the slave.

At each timestamp arrival at the slave, the slave generates a PLL reference X(n) as the sum of the master's timestamp generation interval and the master's measurement of the timestamp inter-arrival intervals from the slave, i.e., $X(n) = \Delta T_g(n) + \Delta T_m(n)$. The slave also generates a PLL output signal Y(n) as the sum of the slave's timestamp generation interval and the slave's measurement of the timestamp inter-arrival intervals from the master, i.e., $Y(n) = \Delta R_g(n) + \Delta R_m(n)$. The phase detector computes the error signal, e(n), as the difference between the PLL reference signal and the PLL output signal divide by 2, i.e., $e(n) = [X(n) - Y(n)]/2$. The error signal is passed on to the loop filter which is responsible for eliminating possible jitter and noise in the input signal. The controlled oscillator which typically has a center frequency, oscillates at a frequency which is determined by the output signal of the loop filter.

The following simple example illustrates advantages of the three-way technique over the one-way technique. For this example the following clock and system variables and terms are defined as:

Master clock frequency (in MHz): $f_{ma} = 1.544$
Slave clock frequency (in MHz): $f_{sl} = 1.542$
Timestamp experiences packet delay variation from Master to Slave (in ms): $j_{ms}$
Timestamp experiences packet delay variation from Slave to Master (in ms): $j_{ms}$
Master to Slave packet delay variation at $f_{sl}$ MHZ (in clock ticks): $P_{ms} = f_{sl} \cdot j_{ms}$
Slave to Master packet delay variation at $f_{ma}$ MHZ (in clock ticks): $P_{sm} = f_{ma} \cdot j_{sm}$
Master timestamp generation interval (in clock ticks): $\Delta T_g = 1000$
Slave timestamp generation interval (in clock ticks): $\Delta R_g = 1000$ Master timestamp inter-arrival interval (in clock ticks):

$$\Delta T_m = \frac{f_{ma}}{f_{sl}} \Delta R_g + P_m$$

Slave timestamp inter-arrival interval (in clock ticks):

$$\Delta R_m = \frac{f_{sl}}{f_{ma}} \Delta T_g + P_{ms}$$

Phase detector error in one-way scheme (in clock ticks):
$e_1 = \Delta T_g - \Delta R_m$ Phase detector error in three-way scheme (in clock ticks):

$$e_3 = \frac{(\Delta T_g + \Delta T_m) - (\Delta R_g + \Delta R_m)}{2}$$

One-way to three-way error ratio:

$$\eta = \left| \frac{e_1 - e_3}{e_3} \right|$$

These definitions yield the results shown in Table 1. It can be observed from these results that the three-way technique generates much lower PLL input errors as compared to the one-way technique. Under packet delay variation ("PDV") conditions in both directions in a network, the three-way technique is able to use the reverse PDV to mitigate the effects of the forward PDV on the PLL input error.

TABLE 1

Comparison between the one-way and proposed three-way message exchange techniques

|  | Case 1 | Case 2 | Case 3 | Case 4 | Case 5 | Case 6 |
| --- | --- | --- | --- | --- | --- | --- |
| PDV from Master to Slave, $j_{ms}$ (ms) | 0 | 5 | 5 | 8 | 1 | 3 |
| PDV from Slave to Master, $j_{sm}$ (ms) | 0 | 5 | 8 | 5 | 3 | 1 |
| PDV from Master to Slave, $P_{ms}$ (clock ticks) | 0 | 7710 | 7710 | 12336 | 1542 | 4626 |
| PDV from Slave to Master, $P_{sm}$ (clock ticks) | 0 | 7720 | 12352 | 7720 | 4632 | 1544 |
| Master timestamp generation interval, $\Delta T_g$ (clock ticks) | 1000 | 1000 | 1000 | 1000 | 1000 | 1000 |
| Slave timestamp generation interval, $\Delta R_g$ (clock ticks) | 1000 | 1000 | 1000 | 1000 | 1000 | 1000 |
| Master timestamp inter-arrival interval, $\Delta T_m$ (clock ticks) | 1001.3 | 8721.3 | 13353.3 | 8721.3 | 5633.3 | 2545.3 |
| Slave timestamp inter-arrival interval, $\Delta R_m$ (clock ticks) | 998.71 | 8708.7 | 8708.7 | 13334.7 | 2540.7 | 5624.7 |

TABLE 1-continued

Comparison between the one-way and proposed three-way message exchange techniques

|  | Case 1 | Case 2 | Case 3 | Case 4 | Case 5 | Case 6 |
|---|---|---|---|---|---|---|
| Error in one-way scheme, $e_1$ (clock ticks) | 1.29539 | −7708.7 | −7708.7 | −12334.7 | −1540.7 | −4624.7 |
| Error in three-way scheme $e_3$, (clock ticks) | 1.29618 | 6.29618 | 2322.3 | −2306.7 | 1546.3 | −1539.7 |
| Error ratio, $\eta = \left\| \frac{e_1 - e_3}{e_3} \right\|$ | 0.000648088 | 1225.35 | 4.31943 | 4.34733 | 1.99638 | 2.00363 |

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method for clock recovery in a network having first and second Time Division Multiplexing ("TDM") segments interconnected by a non-TDM segment, the method comprising the steps of:
   in the first TDM segment, sending master clock timestamps to the second TDM segment;
   in the second TDM segment, measuring a master clock timestamp inter-arrival interval;
   in the second TDM segment, sending slave clock timestamps to the first TDM segment;
   in the first TDM segment, measuring a slave clock timestamp inter-arrival interval;
   in the first TDM segment, sending the slave clock timestamp inter-arrival interval to the second TDM segment;
   in the second TDM segment, calculating an error signal based at least in-part on the difference between the master clock timestamp inter-arrival interval and the slave clock timestamp inter-arrival interval; and
   employing the difference to recover the first service clock in the second TDM segment.

2. The method of claim 1 further including the step of employing the difference to synchronize a circuit in the second TDM segment with a corresponding circuit in the first TDM segment.

3. The method of claim 2 wherein the non-TDM segment includes a packet network segment.

4. The method of claim 1 further including the step of, in the second TDM segment, employing a counter to measure the master clock timestamp inter-arrival interval.

5. The method of claim 1 further including the step of, in the first TDM segment, employing a counter to generate the master timestamp value and the same counter to measure the slave clock timestamp inter-arrival interval.

6. The method of claim 4 further including the step of, at each timestamp arrival in the second TDM segment, generating a Phase Lock Loop ("PLL") reference signal as the sum of a first TDM segment timestamp generation interval and the first TDM segment measurement of the timestamp inter-arrival intervals from the second TDM segment.

7. The method of claim 6 further including the step of, at the second TDM segment, generating a PLL output signal as the sum of a second TDM segment timestamp generation interval and the second TDM segment measurement of the timestamp inter-arrival intervals from the first TDM segment.

8. The method of claim 7 further including the step of employing a phase detector in the second TDM segment to compute an error signal as the difference between the PLL reference signal and the PLL output signal divided by two.

9. The method of claim 8 further including the steps of providing the error signal to a loop filter and employing the loop filter to mitigate jitter and noise.

10. The method of claim 9 further including the step of employing the output of the loop filter to control an oscillator.

11. Apparatus for clock recovery in a network having first and second Time Division Multiplexing ("TDM") segments interconnected by a non-TDM segment, comprising:
   in the first TDM segment, first transmitting circuitry operable to send master clock timestamps to the second TDM segment;
   in the second TDM segment, measuring circuitry operable to measure a master clock timestamp inter-arrival interval;
   in the second TDM segment, second transmitting circuitry operable to send slave clock timestamps to the first TDM segment;
   in the first TDM segment, measuring circuitry operable to measure a slave clock timestamp inter-arrival interval;
   in the first TDM segment, the first measuring circuitry operable to send the slave clock timestamp inter-arrival interval to the second TDM segment;
   in the second TDM segment, calculating circuitry operable to calculate an error signal based at least in-part on the difference between the master clock timestamp inter-arrival interval and the slave clock timestamp inter-arrival interval; and
   recovery circuitry operable to employ the difference to recover the first service clock in the second TDM segment.

12. The apparatus of claim 11 further including synchronizing circuitry operable to employ the difference to synchronize a circuit in the second TDM segment with a corresponding circuit in the first TDM segment.

13. The apparatus of claim 12 wherein the non-TDM segment includes packet network segment.

14. The apparatus of claim 11 further including a counter in the second TDM segment operable to measure the master clock timestamp inter-arrival interval.

15. The apparatus of claim 11 further including a counter in the first TDM segment operable to generate the master timestamp value and to measure the slave clock timestamp inter-arrival interval.

16. The apparatus of claim 13 further including Phase Lock Loop ("PLL") circuitry in the second TDM segment operable at each timestamp arrival to generate a reference signal as the sum of a first TDM segment timestamp generation interval and the first TDM segment measurement of the timestamp inter-arrival intervals from the second TDM segment.

17. The apparatus of claim 16 further including, in the second TDM segment, the calculating circuitry further operable to generate a PLL output signal as the sum of a second TDM segment timestamp generation interval and the second TDM segment measurement of the timestamp inter-arrival intervals from the first TDM segment.

18. The apparatus of claim 17 further including a phase detector in the second TDM segment operable to compute an error signal as the difference between the PLL reference signal and the PLL output signal divided by two.

19. The apparatus of claim 18 further including a loop filter operable in response to the error signal to mitigate jitter and noise.

20. The apparatus of claim 19 further including an oscillator operable in response to the output of the loop filter.

* * * * *